United States Patent

Kaiser

[15] 3,699,167
[45] Oct. 17, 1972

[54] 1-ALKYL-4-BIS(HALOALKYL)AMINO-3,5-DINITROBENZENE

[72] Inventor: Donald W. Kaiser, New Haven, Conn.

[73] Assignee: The Ansal Company, Marinette, Wis.

[22] Filed: Nov. 17, 1969

[21] Appl. No.: 877,507

[52] U.S. Cl. .................. 260/577, 71/121, 260/573
[51] Int. Cl. ................................................ C07c 87/60
[58] Field of Search ............................... 260/577, 573

[56] References Cited

UNITED STATES PATENTS 3,257,190   6/1966   Soper ..................... 260/577 X
3,442,639   5/1969   Soper ..................... 260/577 X

*Primary Examiner*—Charles B. Parker
*Assistant Examiner*—Charles F. Warren
*Attorney*—Morgan, Finnegan, Durham & Pine

[57] ABSTRACT

Novel 1-alkyl-4-bis(halogenoalkylene)amino-3,5-dinitrobenzene and 1-alkyl-4-bis(hydroxyalkylene)amino-3,5-dinitrobenzene derivatives are disclosed as well as the use of the halogenated compounds as pre-emergent herbicides for the elimination of broadleaf weeds and grasses. The hydroxyalkylene compounds serve as useful intermediates in the preparation of the corresponding halogenated derivatives which are active pre-emergent herbicides.

4 Claims, No Drawings

1-ALKYL-4-BIS(HALOALKYL)AMINO-3,5-DINITROBENZENE

BACKGROUND OF THE INVENTION

This invention relates to novel compounds which are agriculturally useful. More particularly, this invention is concerned with novel 1-alkyl-4-bis(halogenoalkylene)amino-3,5- dinitrobenzene derivatives and to a method for eliminating undesired broadleaf weeds and grasses by applying the aforesaid novel derivatives to an area infested with such weeds and grasses. More importantly, the herein disclosed pre-emergent herbicides are selective in that they destroy the undesirable broadleaf weeds and grasses without affecting or injuring the plants or crops which are growing in the same area. For example, particular selectivity is found with cotton, soybeans and rice.

In agriculture, there is a continual and neverending search for selective herbicides. Selectivity is an essential characteristic since one does not want to injure or affect the plants or crops growing simultaneously in the same area where the undesirable broadleaf weeds and grasses are found. For instance, the cultivation of cotton is a time-consuming and exacting process which is greatly hampered by weed growth. It would therefore be of great value to provide a pre-emergent herbicide which possesses this selective capability.

SUMMARY OF THE INVENTION

Accordingly, this invention is concerned with novel compounds of the formula:

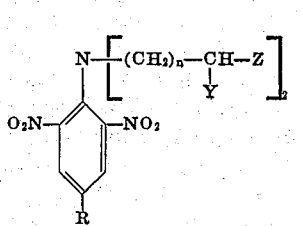

wherein R is alkyl containing from one to four carbon atoms; n is an integer from 1 to 3; Y is selected from the group consisting of h, alkyl of 1 to 14 carbon atoms and cyclohexyl; and Z is selected from the group consisting of hydroxy and halogen (F, Cl, Br, I).

Of special interest are compounds designated by the above formula wherein Z is halogen (F, Cl, Br, I), R is methyl, n is 1 and Y is H such as 4-Bis (2-fluoroethyl)amino-3,5-dinitrotoluene, 4-Bis(2-chloroethyl)amino-3,5-dinitrotoluene, 4-Bis(2-Bromoethyl)amino-3,5-dinitrotoluene, and 4-Bis(2-Iodoethyl)amino-3,5-dinitrotoluene. Also included within the purview of this invention is the method of eliminating broad-leaf weeds and grasses from an area without injuring the plants or crops thereon by applying an effective amount of the herein described novel herbicides, i.e., wherein Z is halogen in the above formula.

DETAILED DESCRIPTION OF THE INVENTION

The novel compounds of this invention can be prepared by adhering to the following scheme:

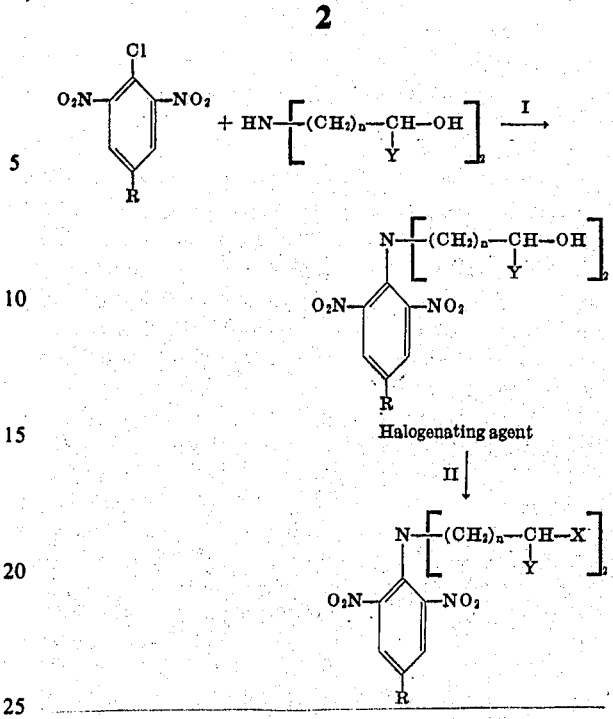

wherein R, n and Y are as defined above and X is halogen (F, Cl, Br, I). The first step, i.e., the preparation of novel 1-alkyl-4-bis(hydroxyalkylene)amino-3,5-dinitrobenzene intermediates is a displacement reaction between a secondary amine and a chlorobenzene compound activated by nitro groups resulting in the formation of the appropriate tertiary amine with the concurrent elimination of HCl. The starting materials, 1-alkyl-4-chloro-3,5-dinitrobenzenes and dialkanolamines are either easily prepared by well-documented synthetic procedures or are commercially available.

Reaction I must be carried out in the presence of an acid acceptor such as sodium carbonate in order to neutralize the HCl which forms as a by-product. In the absence of acid acceptor, the reaction cannot go to completion due to the unavailability of secondary amine reagent which becomes tied up with the acid by-product.

In lieu of acid acceptor, and excess (at least 1 equivalent) of secondary amine may be used. In fact, it is preferred to use a three-fold equivalent excess of amine which serves as solvent in addition to being a reagent.

The reaction is generally carried out in the presence of an organic solvent such as absolute alcohol at elevated temperatures. In some instances, refluxing temperatures are desirable. When $Na_2CO_3$ is used as acid acceptor, reaction is visible due to evolution of $CO_2$ gas and can be used as a guide to determine completion of reaction.

It is also possible to carry out Reaction I without an organic solvent. As mentioned earlier, an excess of amine reagent can serve as solvent while simultaneously driving the reaction to completion. Alternatively, an aqueous system can be used, e.g., a mixture of chlorobenzene compound and water can be refluxed and, while stirring, a stoichiometric equivalent amount of secondary amine reagent is added. With continued refluxing, an equivalent amount of aqueous sodium hydroxide is added gradually. The NaOH liberates the amine from its hydrochloride salt and permits reaction to proceed to completion. The product from Reaction I is generally recovered from the reaction mixture by partial removal of solvent and filtration. This material can either be used as such or may be recrystallized.

The second or final step concerns the conversion of a hydroxy group to a halogen group. Obviously, fluorination is effected by a fluorinating agent, chlorination by a chlorinating agent, bromination by a brominating agent and iodination by an iodinating agent. In this regard, the particular halogenating agent is not critical and any one of several which are commonly known to all researchers can be used for purposes of this invention.

A typical chlorinating agent is thionyl chloride although $PCl_3$ will provide equivalent results. Phosphorus tribromide ($PBr_3$) and hydroiodic acid are typical brominating and iodinating agents, respectively. An example of a fluorinating agent is perchloryl fluoride. Illustrative of the fluoro compounds disclosed by the present invention include:

4-Bis(2-Fluoroethyl)amino-3,5-dinitrotoluene 4-Bis(3-Fluoropropyl)amino-3,5-dinitrotoluene 4-Bis(3-Fluorobutyl)amino-3,5-dinitrotoluene 1-Ethyl-4-bis(2-fluoroethyl)-aminoe-3,5-dinitrobenzene 1-n-propyl-4-bis(3-fluoropropyl)amino-3,5-dinitrobenzene 1-n-Butyl-4-bis(4-fluorobutyl)-amino-3,5-dinitrobenzene It should be understood that the above mentioned halogenating agents are only illustrative and many others may of course be used in their stead.

Step II is generally carried out in a suitable solvent under refluxing conditions. Of course, it is to be recognized that if the halogenating agent is a gas, it is bubbled into the solution at a sufficient rate to allow reaction to take place. Conventional work-up comprising evaporation, filtration and recrystallization is followed in the isolation of product.

The hydroxyalkylene compounds derived from Reaction I are not useful to any extent as pre-emergent herbicides. However, they are novel and serve as important and useful intermediates in the preparation of the corresponding halogenated derivatives which are active pre-emergent herbicides. They find utility, therefore, as useful intermediates in the preparation of valuable pre-emergent herbicides.

The novel 1-alkyl-4bis(halogenoalkylene)amino-3,5-dinitrobenzene derivatives may be used alone or in combination with a wetting agent when utilized for their herbicidal action. Suitable wetting agents include polyoxyalkylene thioethers and certain anionic surfactants such as alkyl aryl sulfonates.

The herbicidal processes of this invention comprise applying a herbicidally effective amount of a compound disclosed herein to an area infested with seedling or germinating weed grasses, grass weed, or broadleaf weed seeds or broadleaf weeds either in the seedling or mature stage of growth. The compounds preferably are formulated for herbicidal use either as sprays made up by adding water to emulsifiable concentrates or powders, as granules or as dispersions on carriers such as attapulgite clay granules, peat moss, fertilizer, vermiculite, etc.

Since the compounds, as free bases, are quite insoluble in water, wetting agents are generally included in the preparation of the aforesaid emulsions or powders. The amount of wetting agent employed will vary from about 0.1 to about 5 percent, preferably 0.25 to 1.0 percent by weight of the total herbicidal solution or composition.

It is a considerable advantage of this invention that the 1-alkyl-4-bis(halogenoalkylene)amino-3,5-dinitrobenzene derivatives as defined above do not affect the growth of crop plants in the pre-emergent stage of growth at concentrations which virtually eliminate germinating and seedling grasses and broadleaf weeds from an area infested therewith. Among the plants and crops which will tolerate effective concentrations of the herein disclosed compounds are cotton, soybean and rice.

The herbicidal compositions described herein will oridinarily be applied in a quantity at least about 1 lb. and preferably about 2 or between 2 and 10 lbs. of active herbicide per acre of cropland being treated.

The following examples are provided by way of illustration and should not be interpreted as limiting the invention, many variations of which are possible without departing from the spirit or scope thereof:

EXAMPLE I

4-Bis(2-Hydroxyethyl)-amino-3,5-Dinitrotoluene

To a stirred slurry containing 4-chloro-3,5-dinitrotoluene (649.5 g., 3.0 M), anhydrous sodium carbonate (185.5 g., 1.75 M) and absolute alcohol (1 liter) heated to reflux (81° C.), is added diethanolamine (376.5 g., 3.5 M) in 200 ml. of absolute alcohol over a one-half hour period. After completion of addition, the resulting mixture was heated for an additional 5 hours. The mixture was then stripped under partial vacuum to remove about one-third of the solvent originally present.

The solid which precipitates is then filtered, washed well with water and air-dried to give product in 78 percent yield.

Recrystallization from benzene gave a product, M.P. 117°–118° C.

Analysis: Calculated for $C_{11}H_{15}N_3O_6$: %C, 46.31; %H, 5.26; %N, 14.73

Found: %C, 46.53; %H, %N, 14.73

EXAMPLE II -nitrotoluene -dini-

The procedure of Example I is repeated in preparing the following products wherein the indicated chlorobenzene reagents and amines are used, in stoichiometric equivalent amounts, in place of 4-chloro-3,5-dinitrotoluene and diethanolamine respectively with good results:

| Chlorobenzene reagent | Amine | Product |
| --- | --- | --- |
| 4-chloro-3,5-dinitrotoluene | dipropanolamine | 4-Bis(3-hydroxypropyl)amino-3,5-dinitrotoluene |
| 4-chloro-3,5-dinitrotoluene | dibutanolamine | 4-Bis(4-hydroxybutyl)amino-3,5-dinitrotoluene |
| 1-Ethyl-4-chloro-3,5-dinitrobenzene | diethanolamine | 1-Ethyl-4-bis(2-hydroxyethyl)amino-3,5-dinitrobenzene |
| 1-n-propyl-4-chloro-3,5-dinitrobenzene | dipropanolamine | 1-n-Propyl-4-bis(3-hydroxypropyl)amino-3,5-dinitrobenzene |
| 1-n-butyl-4-chloro 3,5-dinitrobenzene | dibutanolamine | 1-n-Butyl-4-bis(4-hydroxybutyl)amino-3,5-dinitrobenzene |
| 4-chloro-3,5-dinitrotoluene | diisopropanolamine | 4-Bis(2-methyl-2-hydroxyethyl)amino-3,5-nitrotoluene |
| 4-chloro-3,5-dinitrotoluene | di-(2-ethyl)-ethanolamine | 4-Bis(2-ethyl-2-hydroxyethyl)amino-3,5-dinitrotoluene |
| 4-chloro-3,5-eini- | di-(2-n-propyl | 4-Bis(2-n-propyl-2- |

| trotoluen | ethanolamine | hydroxyethyl)amino-3,5-dinitrotoluene |
| --- | --- | --- |
| 4-chloro-3,5-dinitrotoluene | di-(2-n-butyl) ethanolamine | 4-Bis(2-n-butyl-2-hydroxyethyl)amino-3,5-dinitrotoluene |
| 4-chloro-3,5-dinitrotoluene | di-(2-cyclohexyl) ethanolamine | 4-Bis(2-cyclohexyl-2-hydroxyethyl)amino-3,5-dinitrotoluene |

EXAMPLE III

4-Bis(2-Chloroethyl)-amino-3,5-Dinitrotoluene

To a mixture containing 4-bis(2-hydroxyethyl)amino-3,5dinitrotoluene (85.5 g., 0.30 M), benzene (250 ml.) and 5 drops of pyridine is added thionyl chloride (95.2 g., 0.80 M).

The mixture is then cooled in an ice bath and subsequently refluxed for about 6 hours. Evaporation of reaction mixture provided 97.1 g. of product, M.P. 53°–57 C. Recrystallization from ethanol, with charcoal treatment, supplied product, M.P. 60°–61° C. Analysis: Calculated for $C_{11}H_{13}Cl_2N_3O_4$ : %Cl, 22.04; %N, 13.04

Found: %Cl, 21.57 ; %N, 13.33

EXAMPLE IV

4-Bis(2-Bromoethyl)amino3,5-Dinintrotoluene

The procedure of Example III is repeated except an equivalent amount of $PBr_3$ is used in place of thionyl chloride and good yields of product are obtained.

EXAMPLE V

The procedure of Example III is repeated in preparing the following products wherein the following 3,5-dinitrobenzene derivatives are used, in equivalent amounts, instead of 4-bis (2-hydroxyethyl)amino-3,5-dinitrotoluene with comparable results:

| 3,5-Dinitrobenzene Derivative | Product |
| --- | --- |
| 4-bis(3-hydroxypropyl)amino-3,5-dinitrotoluene | 4-bis(3-chloropropyl)amino-3,5-dinitrotoluene |
| 4-bis(4-hydroxybutyl)amino-3,5-dinitrotoluene | 4-bis(4-chlorobutyl)amino-3,5-dinitrotoluene |
| 1-Ethyl-4-bis(2-hydroxyethyl)-amino-3,5-dinitrobenzene | 1-Ethyl-4-bis(2-chloroethyl)-amino-3,5-dinitrobenzene |
| 1-n-Propyl-4-bis(3-hydroxypropyl)-amino-3-dinitrobenzene | 1-n-propyl-4-bis(3-chloropropyl)-amino-3,5-dinitrobenzene |
| 1-n-Butyl-4-bis(4-hydroxybutyl)-amino-3,5-dinitrobenzene | 1-n-Butyl-4-bis(4-chlorobutyl)-amino-3,5-dinitrobenzene |
| 4-Bis(2-ethyl-2-hydroxyethyl)amino-3,5-dinitrotoluene | 4-Bis(2-ethyl-2-chloroethyl)-amino-3,5-dinitrotoluene |
| 4-Bis(2-methyl-2-hydroxyethyl)-amino-3,5-dinitrotolune | 4-Bis(2-methyl-2-chloroethyl)-amino-3,5-dinitrotoluene |
| 4-Bis(2-n-propyl-2-hydroxyethyl)-amino-3,5-dinitrotoluene | 4-Bis(2-n-propyl-2-chloroethyl)-amino-3,5-dinitrotoluene |
| 4-Bis(2-n-butyl-2-hydroxyethyl)-amino-3,5-dinitrotoluene | 4-Bis(2-n-butyl-2-chloroethyl)-ethyl)-amino-3,5-dinitrotoluene |
| 4-Bis(2-cyclohexyl-2-hydroxyethyl)amino-3,5-dinitrotoluene | 4-Bis(2-cyclohexyl-2-chloroethyl)-amino-3,5-dinitrotoluene |

EXAMPLE VI

The procedure of Example IV is repeated in preparing the following products wherein the following 3,5-dinitrobenzene derivatives are used, in equivalent amounts instead of 4-bis(2-hydroxyethyl)amino-3,5-dinitrotoluene with comparable results:

| 3,5-Dinitrobenzene Derivatives | Product |
| --- | --- |
| 4-bis(3-hydroxypropyl)amino-3,5-dimitrotoluene | 4-bis(3-bromopropyl)amino-3,5-dinitrotoluene |
| 4-bis(4-hydroxybutyl)amino-3,5-dimitrotoluene | 4-bis(4-bromobutyl)amino-3,5-dinitrotoluene |
| 1-Ethyl-4-bis(2-hydroxyethyl)-amino-3,5-dinitrobenzene | 1-Ethyl-4-bis(2-bromoethyl)-amino-3,5-dinitrobenzene |
| 1-n-Propyl-4-bis(3-hydroxypropyl)-amino--dinitrobenzene | 1-n-propyl-4-bis(3-bromopropyl)-amino-3,5-dinitrobenzene |
| 1-n-Butyl-4-bis(4-hydroxybutyl)-amino-3,5-dinitrobenzene | 1-n-Butyl-4-bromobutyl)-amino-3,5-dinitrobenzene |
| 4-Bis(2-ethyl-2-hydroxyethyl) amino-3,5-dinitrotoluene | 4-Bis(2-ethyl-2-bromoethyl)-amino-3,5-dinitrotoluene |
| 4-Bis(2-n-propyl-2-hydroxyethyl)-amino-3,5-dinitrotoluene | 4-Bis(2-n-propyl-2-bromoethyl)-amino3,5-dinitrotoluene |
| 4-Bis(2-n-butyl-2-hydroxyethyl)-amino3,5-dinitrotoluene | 4-Bis(2-n-butyl-2-bromoethyl)-amino-3,5-dinitrotoluene |
| 4-Bis(2-cyclohexyl-2-hydroxyethyl) amino-3,5-dinitrotoluene | 4-Bis(2-cyclohexyl-2-bromoethyl)-amino-3,5-dinitrotoluene |
| 4-Bis(2 -methyl-2-hydroxyethyl)-amino-3,5-dinitrotoluene | 4-Bis(2-bromoethyl)-amino-3,5-dinitrotoluene |

EXAMPLE VII

4-Bis(2-Iodoethyl)amino-3,5Dinitrotoluene

The procedure of Example III is repeated except an equivalent amount of hydroiodic acid is used in place of thionyl chloride and good yields of product are obtained.

EXAMPLE VIII

The procedure of Example VII is repeated in preparing the following products wherein the following 3,5-dinitrobenzene derivatives are used, in equivalent amounts, instead of 4-bis (2-hydroxyethyl)amino-3,5-dinitrotoluene with comparable results:

| 3,5-Dinitrobenzene Derivatives | Product |
| --- | --- |
| 4-bis(3-hydroxypropyl)amino-3,5-dinitrotoluene | 4-bis(3-iodopropyl)amino-3,5-dinitrotoluene |
| 4-bis(4-hydroxybutyl)amino-3,5-dinitrotoluene | 4-bis(4-iodobutyl)amino-3,5-dinitrotoluene |
| 1-Ethyl-4-bis(2-hydroxyethyl)-amino-3,5-dinitrobenzene | 1-Ethyl-4-bis(2-iodoethyl)-amino-3,5-dinitrobenzene |
| 1-n-Propyl-4-bis(3-hydroxypropyl)-amino-3,5-dinitrobenzene | 1-n-propyl-4-bis(3-iodopropyl)-amino-3,5-dinitrobenzene |
| 1-n-Butyl-4-bis(4-hydroxybutyl)-amino-3,5-3,5-dinitrobenzene dinitrobenzene | 1-n-Butyl-4-bis(4-iodobutyl)-amino- |
| 4-Bis(2-ethyl-2-hydroxyethyl) amino-3,5-dinitrotoluene | 4-Bis(2ethyl-2-iodoethyl)-amino-3,5-dinitrotoluene |
| 4-Bis(2-n-propyl-2-hydroxyethyl)-amino-3,5-dinitrotoluene | 4-Bis(2-n-propyl-2-iodoethyl)-amino-3,5-dinitrotoluene |
| 4-Bis(2-n-butyl-2-hydroxyethyl)-amino-3,5-dinitrotoluene | 4-Bis(2-n-butyl-2-iodoethyl)-amino-3,5-dinitrotoluene |
| 4-Bis(2-cyclohexyl-2-hydroxyethyl)amino-3,5-dinitrotoluene | 4-Bis(2-cyclohexyl-2-iodoethyl)-amino-3,5-dinitrotoluene |
| 4-Bis(2-methyl- 2-hydroxyethyl)-amino-3,5-dinitrotoluene | 4-Bis(2-methyl-2-iodoethyl)-amino-3,5-dinitrotoluene |

EXAMPLE IX

One foot square flats 4 inches deep were filled with a sandy loam soil and seed of the following plant species were planted in rows: cotton (Gossypium hirsutum var. stoneville 7A), soybeans (Glycine Max var. Hardee), Japanese Barnyard grass (Echinochloa crusgalli var. Fromentacea), German Foxtail millet (Setaria italica), Ivyleaf morningglory (Ipomoea hederacea), and Redroot pigweed (Amaranthus retroflexus). The surface of soil covering the seed was then sprayed with aqueous dispersions of 4-Bis(2-chloroethyl)-amino-3,5-dinitrotoluene at rates equivalent to 4, 2, 1, and 0.5 lbs/acre. Immediately after spraying, the top one-half inch of soil was mixed thoroughly to insure that the chemical was mixed with the soil covering the seed.

The experiment was evaluated at 7 and 14 days after application. The results obtained indicate that the chemical is effective as an incorporated pre-emergent herbicide against all weed and grass species tested. Cotton and soybeans were not injured whereas all other plant species were killed or severely stunted.

EXAMPLE X

This test was conducted according to procedures described and at the rates in Example X except that Peanuts (*Arachis hypogaea*) and teaweed (*Sida spinosa*) were additionally planted. The compound, 4-Bis(2-chloroethyl)amino-3,5-dinitrotoluene was tested as an incorporated pre-emergent herbicide.

The test was evaluated 7 and 14 days after application and the results indicate that Japanese millet, foxtail, and pigweed were killed at all rates used in the test. Teaweed was severely stunted at rates of 1 lb./acre and greater. Morningglory was stunted at 2 and 4 lbs./acre. Cotton and peanuts are growing normally at all rates used in the test.

EXAMPLE XI

A solution of 4-Bis(2-chloroethyl)amino-3,5-dinitrotoluene was applied in a 75 per cent acetone solution at rates of 1.0, 2.0, 4.0, and 6.0 pounds per acre. The compound was applied with a sprayer to the surface of the soil and then immediately mixed (incorporated) in the top 1.5 inches. The experimental area was then planted to soybeans (*Glycine max* L.), cotton (*Gossypium nirsutum*), annual morningglory (*Ipomoea hederacea* L.), Japanese millet (*Echinochloa crusgalli* vars. frumentacea), and Johnsongrass (*Sorghum halepense* L. Pers.). Observations made as late as seven weeks after the application showed that the grasses were better than 95 per cent controlled at the 1.0 pound per acre rate. Less than 60 per cent controlled of morningglory was obtained at the 6.0 pound per acre rate. Cotton plants and soybean plants were not harmed by the chemical.

The results of this experiment indicate the effectiveness of the test compound as an incorporated pre-emergent herbicide for use in cotton and soybean farming.

EXAMPLE XII

Two rates of 4-Bis(2-chloroethyl)amino-3,5-dinitrotoluene were sprayed on the soil surface and mixed (incorporated) with the upper 1.0, 2.0, or 3.0 inches of soil. The chemical was applied in an aqueous dispersion at 1.0 and 2.0 pounds per acre. Cotton was planted subsequent to soil incorporation of the chemical. Visual ratings taken three weeks after treatment showed that pigweed (*Amaranthus retroflexus* L.), purslane (*Portulaca oleracea* L.), seedling Johnsongrass (*Sorghum halepense* L. Pers.), Japanese millet (*Echinochloa crusgalli* var. frumentacea), and German millet (*Setaria italica*) were greater than 90 per cent controlled at both rates and at all depths of incorporation. Cotton injury was not visibly evident.

What is claimed is:

1. A compound of the formula:

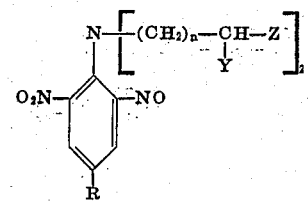

wherein R is alkyl containing from one to four carbon atoms; $n$ is an integer from 1 to 3; Y is selected from the group consisting of H, alkyl of one to four carbon atoms and cyclohexyl; and Z is selected from the group consisting of fluorine, chlorine, bromine and iodine.

2. A compound as claimed in claim 1 wherein R is methyl, n is 1 Y is H.

3. A compound as claimed in claim 2 wherein Z is Cl.

4. A compound as claimed in claim 2 wherein Z is Br.

* * * * *

UNITED STATES PATENT OFFICE
CERTIFICATE OF CORRECTION

Patent No. 3,699,167      Dated October 17, 1972

Inventor(s) Donald W. Kaiser

It is certified that error appears in the above-identified patent and that said Letters Patent are hereby corrected as shown below:

Column 1, line 48, change "14" to --4--.

Column 3, line 26, change "aminoe" to --amino--.

Column 4, line 30, change "376.5" to --367.5--.

Column 4, line 43, change "%H, %N" to --%H, 5.26; %N--.

Column 4, line 45, after EXAMPLE II, delete "-nitrotoluene-dini-".

Column 4, line 66, under Product column, change "3,5-nitrotoluene" to --3,5-dinitrotoluene--.

Column 4, line 70, under Chlorobenzene reagent column, change "3,5-eini-" to --3,5-dini- --.

Column 5, line 1, change "trotoluen" to --trotoluene--.

Column 5, line 25, change "Dinintrotoluene" to --Dinitrotoluene--.

Column 5, line 43, (first column) change "4-hydroxybu-" to -- 4-hydroxybut- --.

Column 5, line 51, (second column) delete "ethyl)-".

Column 5, line 67, (first column) change "3,5-dimitrotoluene" to --3,5-dinitrotoluene--.

PO-1050
(5/69)

UNITED STATES PATENT OFFICE
CERTIFICATE OF CORRECTION

Patent No. 3,699,167      Dated October 17, 1972

Inventor(s) Donald W. Kaiser

It is certified that error appears in the above-identified patent and that said Letters Patent are hereby corrected as shown below:

(Continued)

Column 5, line 69, (first column) change "dimitrotoluene" to --dinitrotoluene--.

Column 6, line 4, (first column) after the word "amino-" insert --3,5--.

Column 6, line 5, (second column) change "4-bromobu-" to -- 4-bis(4-bromobu- --.

Column 6, line 13, (second column) change "(2-bromoethyl) to --(2-methyl-2-bromoethyl)--.

Column 6, line 42, (first column), delete "3,5-"

Column 6, line 43, (first column), delete "dinitrobenzene"

Column 6, line 41, (second column), change "-amino- to --amino-3,5 dinitrobenzene--.

Column 8, line 27 (in the formula) change "NO" to --$NO_2$--.

Signed and sealed this 6th day of March 1973.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,699,167   Dated   October 17, 1972

Inventor(s)   Donald W. Kaiser

It is certified that error appears in the above-identified patent and that said Letters Patent are hereby corrected as shown below:

At the top of page 1, change "Assignee: The Ansal Company" to -- Assignee: The Ansul Company --

Signed and sealed this 27th day of November 1973.

(SEAL)
Attest:

EDWARD M. FLETCHER, JR.
Attesting Officer

RENE D. TEGTMEYER
Acting Commissioner of Patents